US012404723B2

(12) United States Patent
Jeanneret

(10) Patent No.: US 12,404,723 B2
(45) Date of Patent: Sep. 2, 2025

(54) LADDER SAFETY APPARATUS

(71) Applicant: Brandon Jeanneret, Parkland, FL (US)

(72) Inventor: Brandon Jeanneret, Parkland, FL (US)

( * ) Notice: Subject to any disclaimer, the term of this patent is extended or adjusted under 35 U.S.C. 154(b) by 1015 days.

(21) Appl. No.: 17/384,226

(22) Filed: Jul. 23, 2021

(65) Prior Publication Data

US 2023/0027619 A1 Jan. 26, 2023

(51) Int. Cl.
*E06C 7/48* (2006.01)
*E06C 1/34* (2006.01)
*E06C 1/12* (2006.01)

(52) U.S. Cl.
CPC ................ *E06C 7/482* (2013.01); *E06C 1/34* (2013.01); *E06C 1/12* (2013.01)

(58) Field of Classification Search
CPC ... E06C 1/34; E06C 7/081; E06C 7/48; E06C 7/482; E06C 7/16; E06C 7/165; A01M 31/02
See application file for complete search history.

(56) References Cited

U.S. PATENT DOCUMENTS 1,553,279 A * 9/1925 Wirth ...................... E06C 7/482 182/123
2,808,975 A * 10/1957 Palmquist ............... E06C 7/482 182/120
3,146,854 A * 9/1964 Terwilliger ............... E06C 7/48 182/120
4,056,270 A * 11/1977 Greenfield ................ B60R 3/00 280/166
4,593,790 A * 6/1986 Brewer ................... E06C 7/482 182/214
5,111,908 A * 5/1992 Reiter ..................... E06C 7/081 182/120
5,664,643 A * 9/1997 Taylor, Jr. ................. E06C 7/48 182/214
5,899,296 A * 5/1999 Lantz ........................ E06C 7/48 248/238
5,931,257 A * 8/1999 Harden ................... E06C 7/081 182/92
6,691,825 B2 * 2/2004 Haig ....................... E06C 7/482 248/238
10,030,448 B2 * 7/2018 Miller ..................... E06C 7/482
2002/0108811 A1 * 8/2002 Ulmschneider ......... E06C 7/482 182/206
2004/0216955 A1 * 11/2004 Unger ..................... E06C 7/482 182/206
2013/0327907 A1 * 12/2013 Reitz .................... F16M 13/025 248/210
2018/0258698 A1 * 9/2018 Minock ................... E06C 7/482

* cited by examiner

*Primary Examiner* — Colleen M Chavchavadze
(74) *Attorney, Agent, or Firm* — The Rapacke Law Group, P.A.; Andrew S. Rapacke

(57) ABSTRACT

A ladder attachment may allow a ladder to securely rest on a corner of a structure, structure corners, tree, or the like. The attachment may be attached to the rung of a ladder via several mounting brackets and mounting flanges. The attachment includes first and second arms which may be arranged at about a 90° angle to allow the positioning a ladder on the corner of the structure or oddly shaped structures during use.

20 Claims, 4 Drawing Sheets

LADDER SAFETY APPARATUS

TECHNICAL FIELD

The embodiments generally relate to the field of ladder safety.

BACKGROUND

Ladders may be difficult to safely lean or prop against corners or round features on structures or trees. Reducing ladder accidents, and in particular those involving dangerous lateral movement of the ladder, by providing a means of embracing existing corners and round features on structures or trees can improve overall safety of ladder use.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

A ladder attachment may allow a ladder to securely rest on a corner of a structure, tree, or the like. The attachment releasably engages via a plurality of bolts to the top end of a ladder and extends laterally to contact the corner of the structure. The attachment includes first and second arms which may be arranged at about a 90° angle to allow the ladder to securely rest on the corner of a structure during use. A central portion allows for the ladder to securely rest on a structure corner, tree, or the like.

The ladder attachment may include a top panel affixed to a bottom panel via a web similar to that of a traditional I-beam. The top panel may be constructed and arranged to engage and securely rest against a corner of a structure, tree, or various other structures.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
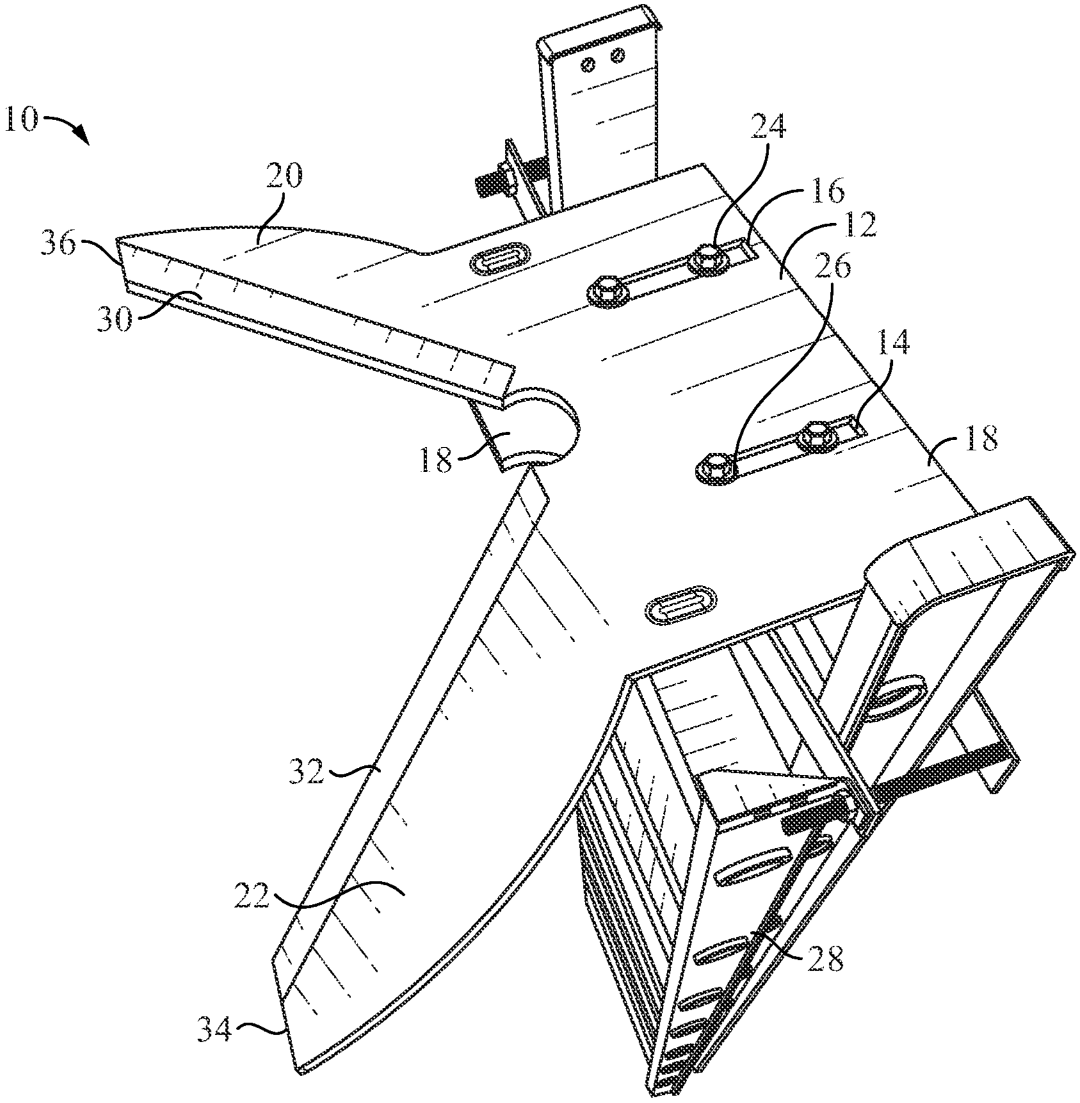
FIG. 1 illustrates a view of an assembled ladder attachment according to some variations described herein.

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The ladder attachment may include a top panel affixed to a bottom panel via a web. The top panel may be constructed and arranged to engage and securely rest against a corner of a structure, tree, or various other structures via first and second arms extending away from the ladder attachment. The ladder attachment may include a first and second mounting brackets constructed and arranged to mechanically connect to the top and bottom panels to secure the ladder attachment to a rung of a ladder.

The scope of the invention will be best understood by the following description of figures. FIG. 1 shows a top-down perspective view of a variation of a ladder attachment 10 that may include a top plate 12 defining a first slot 14 and second slot 16. The top plate 12 may include a first arm 20 and a second arm 22 extending therefrom wherein the first arm 20 and the second arm 22 extend from the top plate 12 at about a 90-degree angle from one another. The arrangement of the first arm 20 and second arm 22 may include narrower or wider angles with respect to position between the two. The first arm 20 may include a generally blade shaped profile 36 constructed and arranged to engage a corner of a structure, tree, or the like. The first arm 20 may include a liner 30 constructed and arranged to pad the ladder attachment 10 when engaged with a corner of a structure, tree, or the like to reduce damage and wear between the first arm 20 and the corner or tree. The liner 30 may include adhesive tape, foam, padding, or the like. The second arm 22 may include a generally blade shaped profile 34 constructed and arranged to engage a corner of a structure, tree, or the like. The second blade 22 may include a liner 32 constructed and arranged to pad the ladder attachment 10 when engaged with a corner, tree, or the like to reduce damage and wear between the second arm 22 and the corner or tree. The liner 32 may include adhesive tape, foam, padding come over the like. The ladder attachment 10 may be connected to a rung of a ladder 28 by means of mounting brackets and a plurality of nut and bolt combination 24, 26 passed through the first slot 14 and the second slot 16 and secured on the second plate 18.

Figure 2:
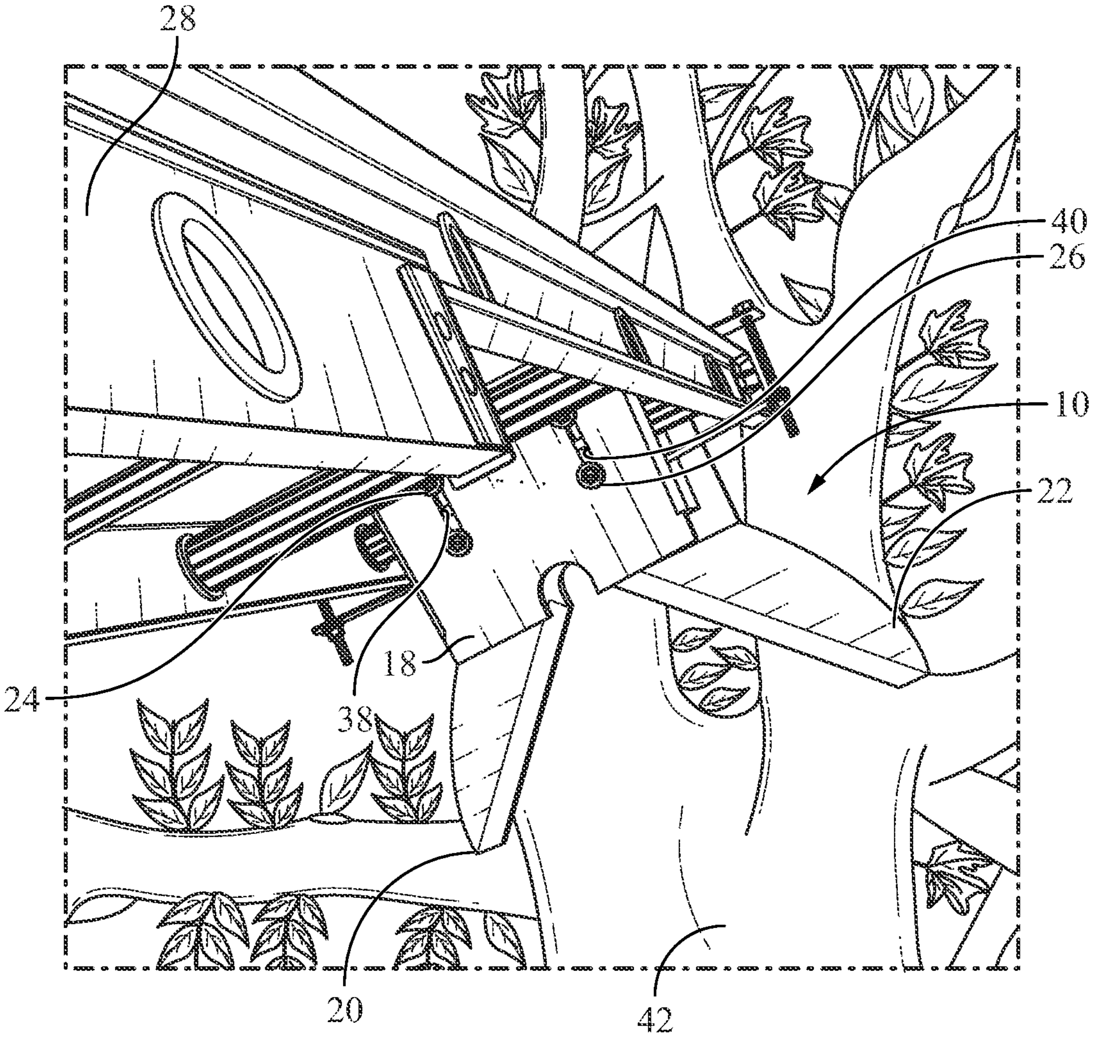
FIG. 2 illustrates a view of an assembled ladder attachment according to some variations described herein.

FIG. 2 shows a bottom-up perspective view of a variation of a ladder attachment 10 that may include a bottom plate 18 securely attaching the ladder attachment 10 to a rung of a ladder 28 via mounting brackets and a plurality of nut and bolt combinations 24, 26, passing through a third slot 38 and a fourth slot 40 defined by the bottom plate 18. The first arm 20 and second arm 22 may be constructed and arranged to securely engage with a corner, tree, or the like 42.

Figure 3A:
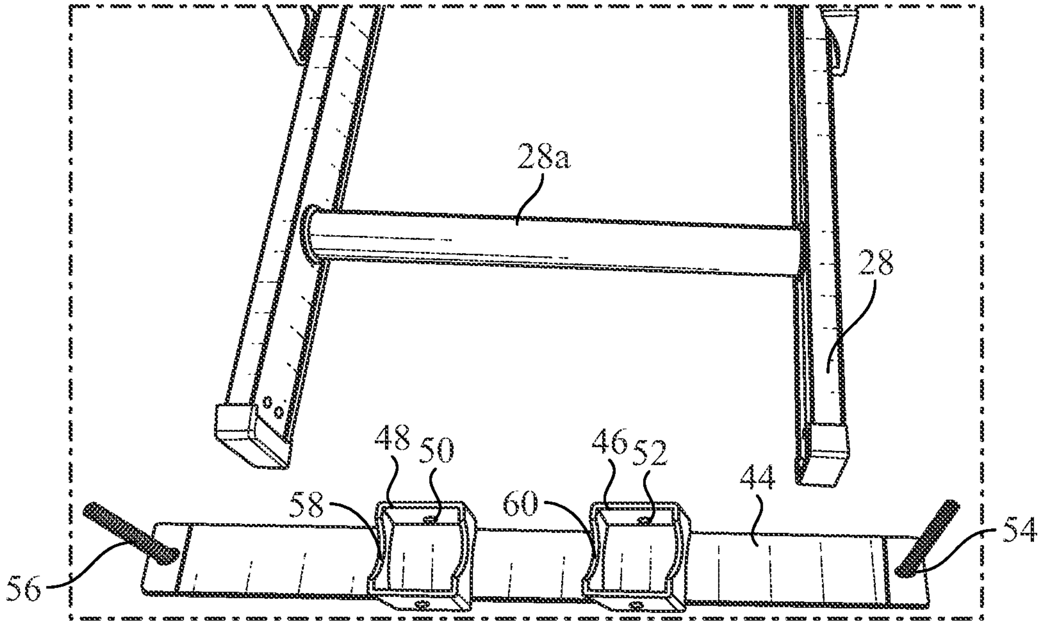
FIG. 3*a* illustrates a view of a portion of a ladder attachment according to some variations described herein.
Figure 3B:
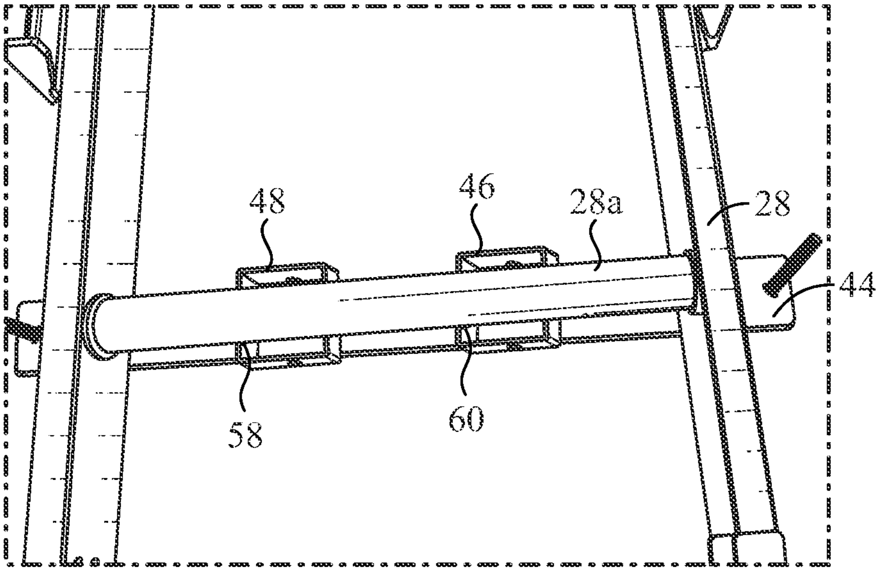
FIG. 3*b* illustrates a view of a portion of a ladder attachment according to some variations described herein.
Figure 3C:
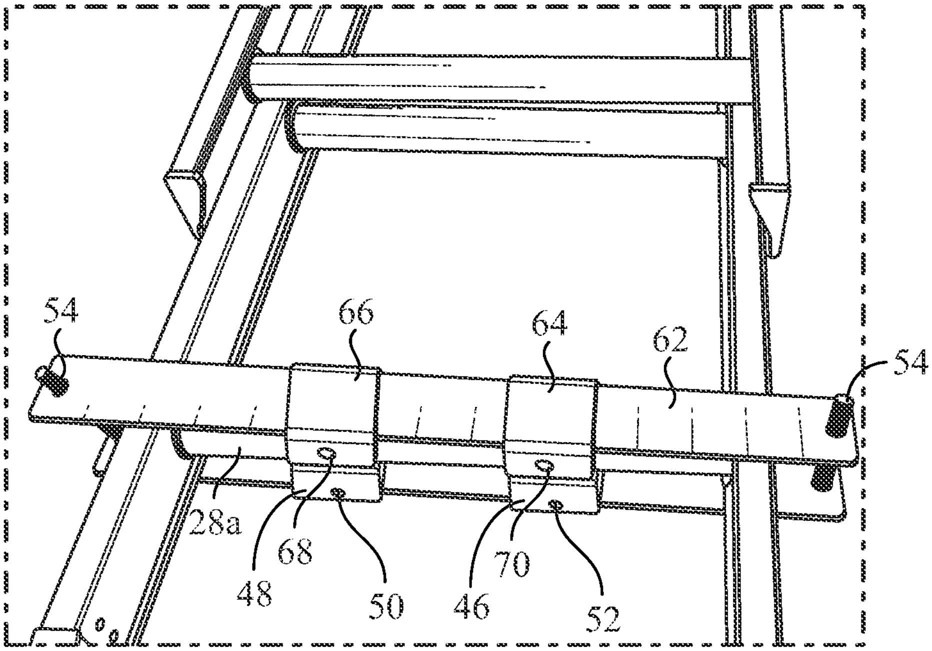
FIG. 3*c* illustrates a view of a portion of a ladder attachment according to some variations described herein.

FIGS. 3*a*-3*d* show multiple views of assembling a ladder attachment 10 to a ladder 28. As seen in FIG. 3*a*, the ladder attachment may include a first mounting bracket 44 that may include a first mounting flange 46 and a second mounting flange 48 constructed and arranged to engage with a rung 28*a* of a ladder 28. The flange may generally be a rectangular tube in shape or may be any other suitable cross section such that the flange 46 may engage a rung 28*a*. The first mounting flange 46 may define recess 60 constructed and arranged to engage with a rung 28*a*. The recess 60 may be generally semi-circular in shape or may be any other suitable shape such that the recess 60 may receive a portion of a rung 28*a*. The first mounting flange 46 may additionally define through holes 52 constructed and arranged to receive a plurality of nut and bolt combinations 24, 26 when the ladder attachment is fully assembled. Similarly, the second mounting flange 48 may define recess 58 constructed and arranged to engage with a rung 28*a*. the second mounting flange 48 may additionally defined through holes 50 constructed and arranged to receive the plurality of nut and bolt combinations 24, 26 when the ladder attachment is fully assembled. The mounting bracket 44 may further include a second plurality of nut and bolt combinations 54, 56 to facilitate mounting the first mounting bracket 44 to a second mounting bracket as best seen in FIG. 3*c*.

Referring to FIG. 3*b*, the first mounting bracket 44 may be placed under the rung 28 of a ladder 28 such that the rung 28*a* is seated within the recess 60 of the first mounting flange 46 and the recess 58 of the second mounting flange 48.

Referring to FIG. 3*c*, a second mounting bracket 62 may be placed on the rung 28*a* such that the third mounting flange 64 and the fourth mounting flange 66 may be seated on the rung 28*a* similar to that of the first mounting flange 46 and the second mounting flange 48 such that the rung 28*a* is mechanically clamped between the first mounting bracket 44 and the second mounting bracket 62. The second plurality of nut and bolt combinations 54, 56 may passed through a portion of the second mounting bracket 62 and may be constructed and arranged to secure the first mounting bracket 44 and the second mounting bracket 62 on the rung 28*a*. The third mounting flange 64 may additionally defined through holes 70 constructed and arranged to receive the plurality of nut and bolt combinations 24, 26 when the ladder attachment is fully assembled. The fourth mounting flange 66 may additionally define through holes 68 constructed and arranged to receive the plurality of nut and bolt combinations 24, 26 when the ladder attachment is fully assembled.

Figure 3D:
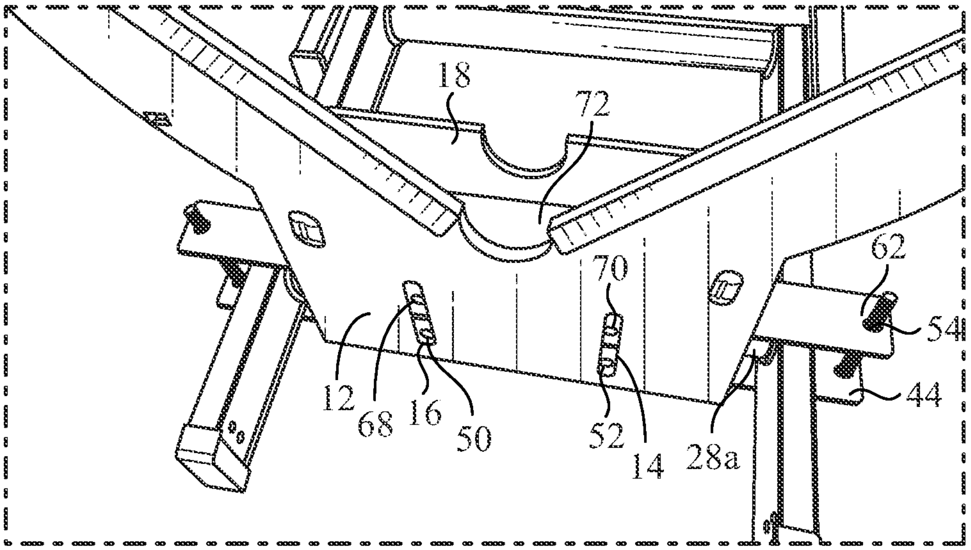
FIG. 3*d* illustrates a view of a portion of a ladder attachment according to some variations described herein.

Referring to FIG. 3*d*, the top plate 12, web 72, and bottom plate 18 may be positioned over the secured first mounting bracket 44 and second mounting bracket 62 and the second plurality of nut and bolt combinations 54 and 56 may be passed through the first slot 14, the second slot 16, third slot 38, fourth slot 40, and through holes 50, 52, 68, and 70 such that the ladder attachment is secured on the rung 28*a*.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a ladder safety apparatus may include a top plate including a body, a first arm, and a second arm, the first arm and second arm extending away from the body of the top plate approximately perpendicular to one another, the top plate defining a first through hole and a second through hole therein. The ladder safety apparatus may include a bottom plate defining a third through hole and a fourth through hole therein; and a web connecting the body of the top plate to the bottom plate. The ladder safety apparatus may include a first mounting bracket including a first mounting flange and a second mounting flange each constructed and arranged to engage with a rung of a ladder, the first mounting bracket defining a fifth through hole and a sixth through hole. The ladder safety apparatus may include a second mounting bracket including a third mounting flange and a fourth mounting flange each constructed and arranged to engage with a rung of a ladder, the second mounting bracket defining a seventh through hole and an eighth through hole. The ladder safety apparatus may include a first plurality of nut and bolt combinations constructed and arranged to thread through the fifth, sixth, seventh, and eighth through holes to mechanically connect the first mounting bracket to the second mounting bracket such that a rung of a ladder is engaged by the first, second, third, and fourth mounting flanges. The top plate, web, and bottom plate are constructed and arranged to mechanically connect to the mechanically connected first mounting bracket and second mounting bracket such that the top plate, web, and bottom plate are secured to a rung of a ladder.

Variation 2 may include a ladder safety apparatus as in variation 1, wherein the top plate and bottom plate are approximately parallel to each other and the web is connected approximately perpendicular to both the top plate and bottom plate;

Variation 3 may include a ladder safety apparatus as in any of variations 1 through 2, wherein the top plate, bottom plate, and web include aluminum.

Variation 4 may include a ladder safety apparatus as in any of variations 1 through 3, wherein the first, second, third, and fourth mounting flanges are rectangular tube in shape.

Variation 5 may include a ladder safety apparatus as in any of variations 1 through 4, wherein the first, second, third, and fourth mounting flanges define respective first, second, third, and fourth recesses therein constructed and arranged to engage with a rung of a ladder.

Variation 6 may include a ladder safety apparatus as in any of variations 1 through 5, wherein the first, second, third, and fourth recesses are approximately semicircular in shape.

Variation 7 may include a ladder safety apparatus as in any of variations 1 through 6, further including a liner disposed on the first arm and second arm.

Variation 8 may include a ladder safety apparatus as in any of variations 1 through 7, wherein the first and the second arm are generally blade shaped.

Variation 9 may include a ladder safety apparatus as in any of variations 1 through 8, wherein the top plate defines an arc-shaped gap between the first arm and the second arm.

According to variation 10, a ladder safety apparatus may include a top plate including a body, a first arm, and a second arm, the first arm and second arm extending away from the body of the top plate approximately perpendicular to one another, the top plate defining a first through hole and a second through hole therein. The ladder safety apparatus may include a bottom plate defining a third through hole and a fourth through hole therein and a web connecting the body of the top plate to the bottom plate. The ladder safety apparatus may include a first mounting bracket defining a fifth through hole and a sixth through hole and a first mounting flange connected to the first mounting bracket, the first mounting flange defining a first set of through holes and a first recess constructed and arranged to engage a rung of a ladder. The ladder safety apparatus may include a second mounting flange connected to the first mounting bracket, the second mounting flange defining a second set of through holes and a second recess constructed and arranged to engage a rung of a ladder. The ladder safety apparatus may include a second mounting bracket defining a seventh through hole and an eighth through hole and a third mounting flange connected to the second mounting bracket, the third mounting flange defining a third set of through holes and a third recess constructed and arranged to engage a rung of a ladder. The ladder safety apparatus may include a fourth mounting flange connected to the second mounting bracket, the fourth mounting flange defining a fourth set of through holes and a fourth recess constructed and arranged to engage a rung of a ladder. The ladder safety apparatus may include a first plurality of nut and bolt combinations constructed and arranged to thread through the fifth, sixth, seventh, and eighth through holes to mechanically connect the first mounting bracket to the second mounting bracket such that a rung of a ladder is engaged by the first, second, third, and fourth mounting flanges. The ladder safety apparatus may include a second plurality of nut and bolt combinations constructed and arranged to thread through the first, second, third, and fourth through holes, and through the first, second, third, and fourth sets of through holes such that the top plate, web, and bottom plate may be connected to the first and second mounting brackets.

Variation 11 may include a ladder safety apparatus as in variation 10, wherein the top plate and bottom plate are approximately parallel to each other and the web is connected approximately perpendicular to both the top plate and bottom plate;

Variation 12 may include a ladder safety apparatus as in any of variations 10 through 11, wherein the top plate, bottom plate, and web include aluminum.

Variation 13 may include a ladder safety apparatus as in any of variations 10 through 12, wherein the first, second, third, and fourth mounting flanges are rectangular tube in shape.

Variation 14 may include a ladder safety apparatus as in any of variations 10 through 13, wherein the first, second, third, and fourth recesses are approximately semicircular in shape.

Variation 15 may include a ladder safety apparatus as in any of variations 10 through 14, further including a liner disposed on the first arm and second arm.

Variation 16 may include a ladder safety apparatus as in any of variations 10 through 15, wherein the first and the second arm are generally blade shaped.

Variation 17 may include a ladder safety apparatus as in any of variations 10 through 16, wherein the top plate defines an arc-shaped gap between the first arm and the second arm.

According to variation 18, a ladder safety apparatus may include a ladder including at least one rung and a top plate including a body, a first arm, and a second arm, the first arm and second arm extending away from the body of the top plate approximately perpendicular to one another, the top plate defining a first through hole, a second through hole, and an arc-shaped gap between the first arm and the second arm therein. The ladder safety apparatus may include a liner disposed on the first arm and the second arm; a bottom plate defining a third through hole and a fourth through hole therein; and a web connecting the body of the top plate to the bottom plate. The ladder safety apparatus may include a first mounting bracket defining a fifth through hole and a sixth through hole and a first mounting flange connected to the first mounting bracket, the first mounting flange defining a first set of through holes and a first recess constructed and arranged to engage the at least one rung of the ladder. The ladder safety apparatus may include a second mounting flange connected to the first mounting bracket, the second mounting flange defining a second set of through holes and a second recess constructed and arranged to engage the at least one rung of the ladder. The ladder safety apparatus may include a second mounting bracket defining a seventh through hole and an eighth through hole and a third mounting flange connected to the second mounting bracket, the third mounting flange defining a third set of through holes and a third recess constructed and arranged to engage the at least one rung of the ladder. The ladder safety apparatus may include a fourth mounting flange connected to the second mounting bracket, the fourth mounting flange defining a fourth set of through holes and a fourth recess constructed and arranged to engage the at least one rung of the ladder. The ladder safety apparatus may include a first plurality of nut and bolt combinations constructed and arranged to thread through the fifth, sixth, seventh, and eighth through holes to mechanically connect the first mounting bracket to the second mounting bracket such that the at least one rung of the ladder is engaged by the first, second, third, and fourth mounting flanges. The ladder safety apparatus may include a second plurality of nut and bolt combinations constructed and arranged to thread through the first, second, third, and fourth through holes, and through the first, second, third, and fourth sets of through holes such that the top plate, web, and bottom plate may be connected to the first and second mounting brackets.

Variation 19 may include a ladder safety apparatus as in variation 18, wherein the first, second, third, and fourth recesses are approximately semicircular in shape.

Variation 20 may include a ladder safety apparatus as in any of variations 18 through 19, wherein the top plate and bottom plate are approximately parallel to each other and the web is connected approximately perpendicular to both the top plate and bottom plate.

Many different embodiments have been disclosed herein, in connection with the above description and the drawing. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A ladder safety apparatus, comprising:

a top plate comprising a body, a first arm, and a second arm, the first arm and second arm extending away from the body of the top plate approximately perpendicular to one another, the top plate defining a first through hole and a second through hole therein;

a bottom plate defining a third through hole and a fourth through hole therein; a web connecting the body of the top plate to the bottom plate;

a first mounting bracket comprising a first mounting flange and a second mounting flange each constructed and arranged to engage with a rung of a ladder, the first mounting bracket defining a fifth through hole and a sixth through hole;

a second mounting bracket comprising a third mounting flange and a fourth mounting flange each constructed and arranged to engage with a rung of a ladder, the second mounting bracket defining a seventh through hole and an eighth through hole;

a first plurality of nut and bolt combinations constructed and arranged to thread through the fifth, sixth, seventh, and eighth through holes to mechanically connect the first mounting bracket to the second mounting bracket such that a rung of a ladder is engaged by the first, second, third, and fourth mounting flanges; and wherein the top plate, web, and bottom plate are constructed and arranged to mechanically connect to the mechanically connected first mounting bracket and second mounting bracket such that the top plate, web, and bottom plate are secured to a rung of a ladder.

2. A ladder safety apparatus as in claim 1, wherein the top plate and bottom plate are approximately parallel to each other and the web is connected approximately perpendicular to both the top plate and bottom plate.

3. A ladder safety apparatus as in claim 1, wherein the top plate, bottom plate, and web comprise aluminum.

4. A ladder safety apparatus as in claim 1, wherein the first, second, third, and fourth mounting flanges are rectangular tube in shape.

5. A ladder safety apparatus as in claim 1, wherein the first, second, third, and fourth mounting flanges define respective first, second, third, and fourth recesses therein constructed and arranged to engage with a rung of a ladder.

6. A ladder safety apparatus as in claim 5, wherein the first, second, third, and fourth recesses are approximately semicircular in shape.

7. A ladder safety apparatus as in claim 1, further comprising a liner disposed on the first arm and second arm.

8. A ladder safety apparatus as in claim 1, wherein the first and the second arm are generally blade shaped.

9. A ladder safety apparatus as in claim 1, wherein the top plate defines an arc-shaped gap between the first arm and the second arm.

10. A ladder safety apparatus, comprising:

a top plate comprising a body, a first arm, and a second arm, the first arm and second arm extending away from the body of the top plate approximately perpendicular to one another, the top plate defining a first through hole and a second through hole therein;

a bottom plate defining a third through hole and a fourth through hole therein;

a web connecting the body of the top plate to the bottom plate;

a first mounting bracket defining a fifth through hole and a sixth through hole;

a first mounting flange connected to the first mounting bracket, the first mounting flange defining a first set of through holes and a first recess constructed and arranged to engage a rung of a ladder;

a second mounting flange connected to the first mounting bracket, the second mounting flange defining a second set of through holes and a second recess constructed and arranged to engage a rung of a ladder;

a second mounting bracket defining a seventh through hole and an eighth through hole;

a third mounting flange connected to the second mounting bracket, the third mounting flange defining a third set of through holes and a third recess constructed and arranged to engage a rung of a ladder;

a fourth mounting flange connected to the second mounting bracket, the fourth mounting flange defining a fourth set of through holes and a fourth recess constructed and arranged to engage a rung of a ladder;

a first plurality of nut and bolt combinations constructed and arranged to thread through the fifth, sixth, seventh, and eighth through holes to mechanically connect the first mounting bracket to the second mounting bracket such that a rung of a ladder is engaged by the first, second, third, and fourth mounting flanges; and a second plurality of nut and bolt combinations constructed and arranged to thread through the first, second, third, and fourth through holes, and through the first, second, third, and fourth sets of through holes such that the top plate, web, and bottom plate may be connected to the first and second mounting brackets.

11. A ladder safety apparatus as in claim 10, wherein the top plate and bottom plate are approximately parallel to each other and the web is connected approximately perpendicular to both the top plate and bottom plate.

12. A ladder safety apparatus as in claim 10, wherein the top plate, bottom plate, and web comprise aluminum.

13. A ladder safety apparatus as in claim 10, wherein the first, second, third, and fourth mounting flanges are rectangular tube in shape.

14. A ladder safety apparatus as in claim 10, wherein the first, second, third, and fourth recesses are approximately semicircular in shape.

15. A ladder safety apparatus as in claim 10, further comprising a liner disposed on the first arm and second arm.

16. A ladder safety apparatus as in claim 10, wherein the first and the second arm are generally blade shaped.

17. A ladder safety apparatus as in claim 10, wherein the top plate defines an arc-shaped gap between the first arm and the second arm.

18. A ladder safety apparatus, comprising:

a ladder comprising at least one rung;

a top plate comprising a body, a first arm, and a second arm, the first arm and second arm extending away from the body of the top plate approximately perpendicular to one another, the top plate defining a first through hole, a second through hole, and an arc-shaped gap between the first arm and the second arm therein;

a liner disposed on the first arm and the second arm;

a bottom plate defining a third through hole and a fourth through hole therein;

a web connecting the body of the top plate to the bottom plate;

a first mounting bracket defining a fifth through hole and a sixth through hole;

a first mounting flange connected to the first mounting bracket, the first mounting flange defining a first set of through holes and a first recess constructed and arranged to engage the at least one rung of the ladder;

a second mounting flange connected to the first mounting bracket, the second mounting flange defining a second set of through holes and a second recess constructed and arranged to engage the at least one rung of the ladder;

a second mounting bracket defining a seventh through hole and an eighth through hole;

a third mounting flange connected to the second mounting bracket, the third mounting flange defining a third set of through holes and a third recess constructed and arranged to engage the at least one rung of the ladder;

a fourth mounting flange connected to the second mounting bracket, the fourth mounting flange defining a fourth set of through holes and a fourth recess constructed and arranged to engage the at least one rung of the ladder;

a first plurality of nut and bolt combinations constructed and arranged to thread through the fifth, sixth, seventh, and eighth through holes to mechanically connect the first mounting bracket to the second mounting bracket such that the at least one rung of the ladder is engaged by the first, second, third, and fourth mounting flanges; and a second plurality of nut and bolt combinations constructed and arranged to thread through the first, second, third, and fourth through holes, and through the first, second, third, and fourth sets of through holes such that the top plate, web, and bottom plate may be connected to the first and second mounting brackets.

19. A ladder safety apparatus as in claim 18, wherein the first, second, third, and fourth recesses are approximately semicircular in shape.

20. A ladder safety apparatus as in claim 18, wherein the top plate and bottom plate are approximately parallel to each other and the web is connected approximately perpendicular to both the top plate and bottom plate.

* * * * *